May 26, 1959 P. WEI 2,888,276
TAPS FOR COMPRESSED GAS RESERVOIRS
Filed June 18, 1956
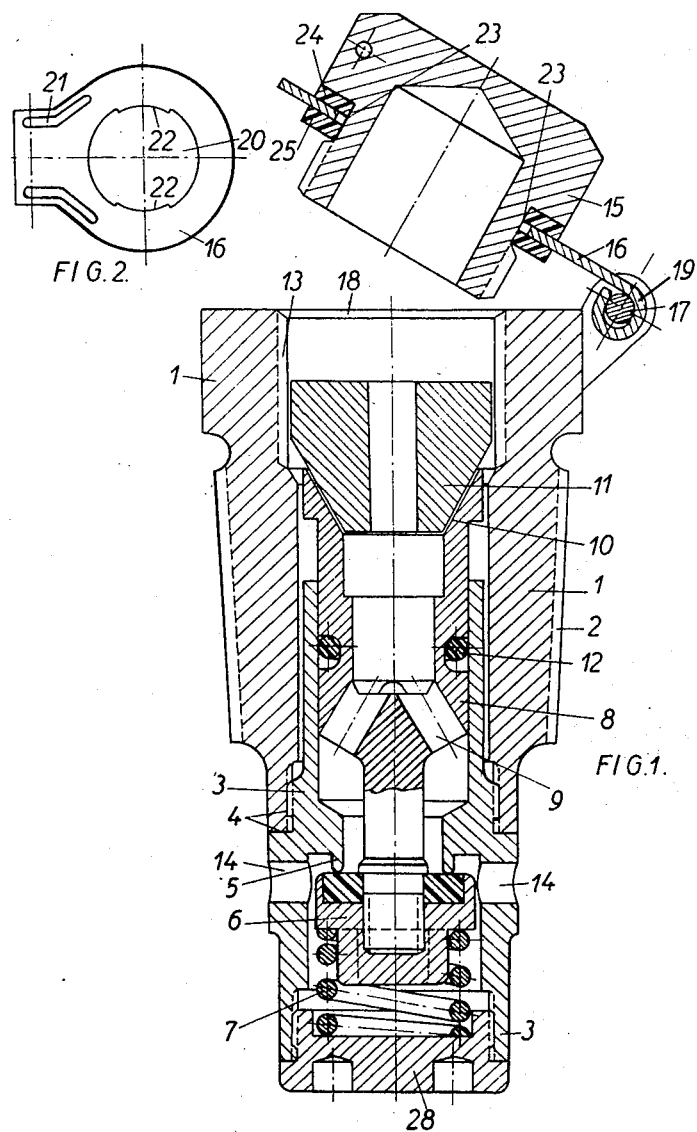
INVENTOR
PIERRE WEI

United States Patent Office 2,888,276
Patented May 26, 1959

2,888,276
TAPS FOR COMPRESSED GAS RESERVOIRS

Pierre Wei, Uccle, Belgium, assignor to Societe Financiere et Industrielle pour la fabrication de l'Acide Carbonique Pur et autres Produits alimentaires, par abreviation: l'Acide Carbonique Pur, Brussels, Belgium, a company of Belgium Application June 18, 1956, Serial No. 592,146

Claims priority, application Belgium April 23, 1956

1 Claim. (Cl. 284—18)

The present invention relates to improvements in a safety device which can form part of the taps of reservoirs containing gases under pressure, especially the taps of gas cylinders, this device being also capable of constituting an automatic safety tap by itself.

The device according to the present invention also enables all escape of gas to be prevented while the apparatus for using the gas is not connected in a completely gas-tight fashion to this device.

In accordance with the invention such a device comprises essentially, in a tube, a valve held on its fixed seating by elastic means, such for example as a helical spring, when the apparatus for using the gas is not connected, and at least one sealing element intended, when said apparatus is connected, to be pressed thereby upon the valve, in the direction of opening thereof and against the elastic means, this latter being calculated in such fashion as to permit the departure of the valve from its seating however only when perfect gas-tightness is ensured by this sealing element between the said device or tap and the said apparatus.

In accordance with one type of construction of the invention, the valve comprises an extension element intended to be capable of sliding in the tube of the device and having at its free end a seating, preferably frusto-conical, intended to receive the sealing element.

According to a particular example of the said type, the tube comprises means permitting it to be closed when the device is not in use, these means being retained on the tube by a pivotably mounted lug.

Further details and features of the invention will appear from the description given hereinafter by way of non-limitative example, and with reference to the accompanying drawings in which:

Figure 1 is a sectional view of a safety tap made in accordance with the invention.

Figure 2 shows a detail of construction.

The invention will be described hereinafter with reference to Figure 1, which represents a particular gas cylinder tap comprising the improvements according to the invention. It will be understood that the device according to the invention can equally be applied to known taps, being attached for example laterally thereto in the form of a perpendicular or oblique extension.

The tap comprises a body 1 having an external thread 2 intended for attachment to a compressed gas cylinder or reservoir. Inside the body 1 there is disposed a sleeve 3 screwed and soldered at 4 into the body 1 and having a part 5 forming a valve seating. A valve 6 is in fact mounted inside the sleeve 3 and is applied against the seating 5 by a calibrated spring 7 bearing on an end plug 28 screwed into the sleeve 3.

Upon the valve 6 there is mounted a body 8 having gas passage orifices 9 and, at its free end, a frusto-conical seating 10 intended to receive the correspondingly shaped pipe end or olive 11. As may be seen from the drawing, this body 8 can slide in the sleeve 3, a packing ring 12 being provided between them.

If the tap is disposed on a cylinder or reservoir in the state as represented, the gas cannot escape due to the fact of the pressure of the valve 6 on its seating 5, ensured by the spring 7.

The apparatus to be supplied with the gas will be mounted through the intermediary of a pipe line, expansion valve or the like in an internal screw-thread 13 of the tap body 1. According to the degree of tightening the pipe end 11 will be compressed, thus ensuring perfect gas-tightness between the tap and the apparatus, before the body 8 commences to move in the sleeve 3, in order finally to move the valve 6 from its seating 5 and permit the passage of the gas entering through the orifices 14 to the orifices 9 and consequently to the connected apparatus.

The calibrated spring 7 must thus be calculated only to yield to the action of the tightening force exerted upon the olive 11.

When the gas cylinders are not in use, their tap normally has a stopper closing the aperture provided for the connection of the user apparatus.

When the cylinder is in use the stopper must be removed, and it is thus easily lost.

On the tap as represented in Figure 1 the stopper 15 is fixed to the body 1 by a lug 16 pivotably mounted on a spindle 17 provided on this body 1. In order to permit the easy arrangement of the stopper 15 on the entry aperture 18 of the body 1, a loop 19 of the lug 16, which surrounds the pivoting spindle 17, is of greater internal dimensions than the latter. Seen in plan view, the lug 16 appears as represented in Figure 2. It comprises a central aperture 20 and reinforcing ribs 21. On the projecting edges 22 of this aperture the stopper 15 is screwed, the lug 16 finally surrounding this stopper in the region of a throat 23 thereof. Thus the stopper can turn freely in relation to the lug but cannot disengage itself therefrom since, to achieve this disengagement, an unscrewing operation is necessary. Furthermore annular packings 24 and 25 can also be provided.

It must be understood that the invention is not limited to the embodiment given, but that many variants may be provided without departing from the scope of the present invention.

I claim:

A safety device for gas reservoir closing comprising a body, a valve in said body, a fixed seating for said valve provided in said body, elastic means for maintaining said valve on said seating, an extension element carried by said valve and slidably mounted in said body so that an inwards displacement of the free end of said extension element against the action of said elastic means causes said valve to open, a seating provided on said extension element at the free end thereof, a sealing element slidably mounted in said body and disposed on said last seating, an entry portion with an internal screw-thread provided in said body for a connecting part of an apparatus to be supplied with gas, and an end face on said sealing element for engaging said connecting part, so that said sealing element is arranged between said connecting part and said extension element.

References Cited in the file of this patent
UNITED STATES PATENTS

| | | |
|---|---|---|
| 1,740,015 | Hooper et al. | Dec. 17, 1929 |
| 1,810,366 | Martin | June 16, 1931 |
| 2,034,933 | Wilson | Mar. 24, 1936 |
| 2,129,704 | Meyer | Sept. 13, 1938 |
| 2,761,469 | Hansen | Sept. 4, 1956 |
| 2,771,308 | Vitcha et al. | Nov. 20, 1956 |